Nov. 19, 1957 H. C. MILLER 2,813,507
CRAB SHEDDING FLOAT
Filed April 25, 1955 2 Sheets-Sheet 1
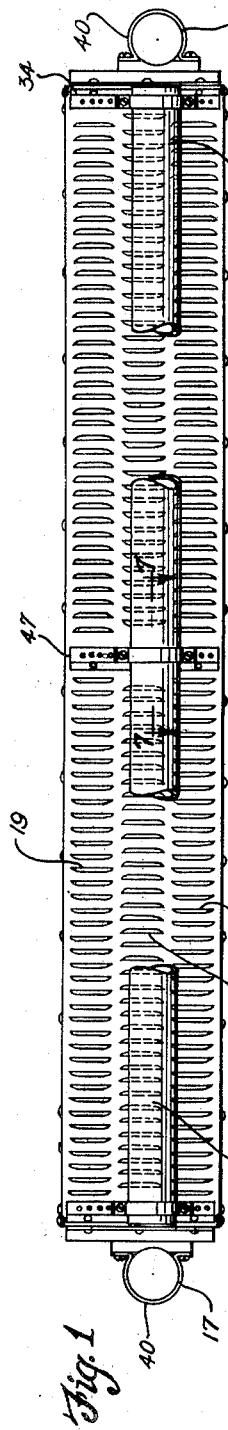
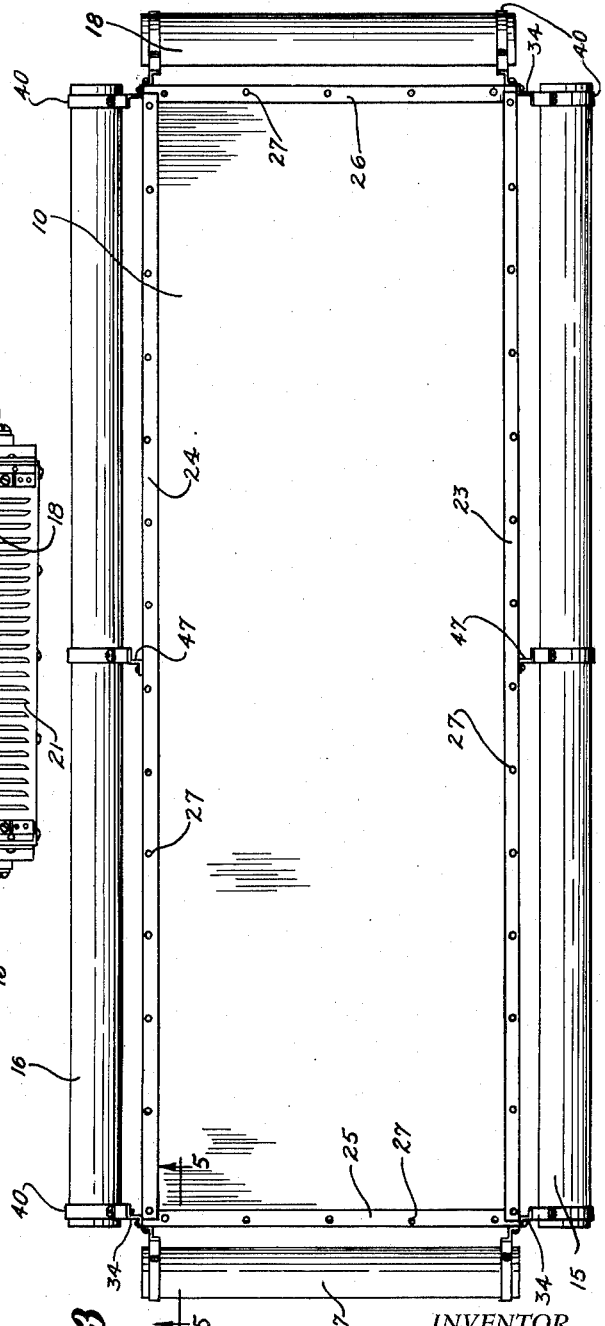
INVENTOR.
Harry C. Miller—DECEASED
Lania Dillard Miller EXECUTRIX
BY Victor J. Evans & Co.
ATTORNEYS Nov. 19, 1957 H. C. MILLER 2,813,507
CRAB SHEDDING FLOAT
Filed April 25, 1955 2 Sheets-Sheet 2
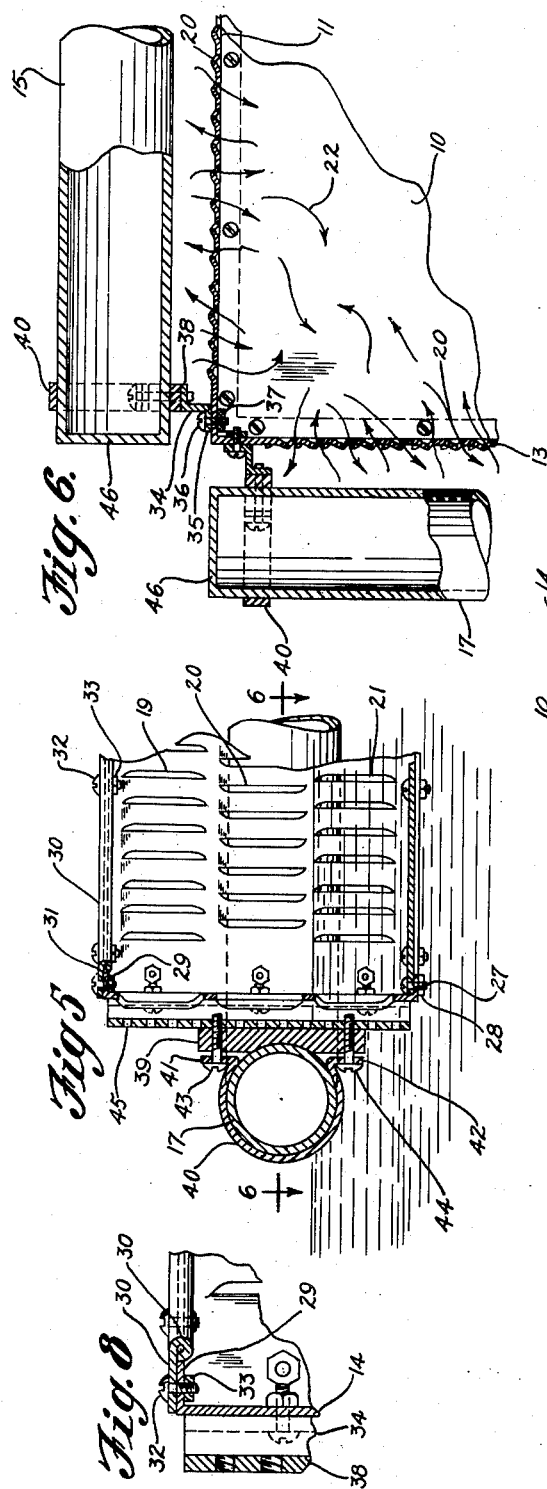
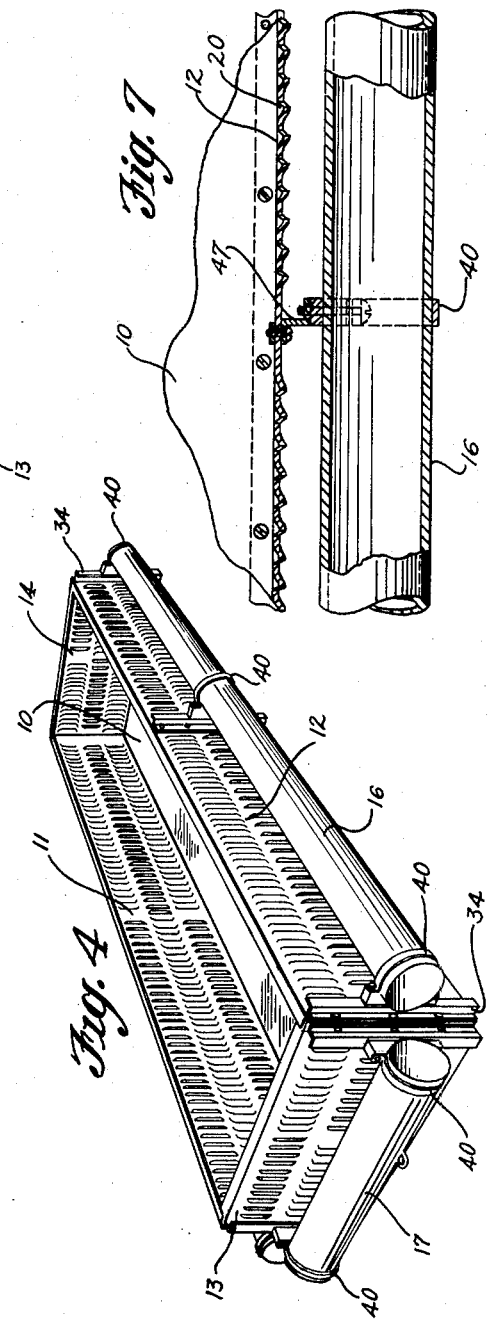
INVENTOR.
Harry C. Miller-DECEASED
Lena Dilliard Miller-EXECUTRIX
BY Victor J. Evans & Co.
ATTORNEYS United States Patent Office 2,813,507
Patented Nov. 19, 1957

2,813,507
CRAB SHEDDING FLOAT

Harry C. Miller, deceased, late of Baltimore, Md., by Lania Dillard Miller, executrix, Baltimore, Md.

Application April 25, 1955, Serial No. 503,428

7 Claims. (Cl. 119—2)

This invention relates to floats in which soft shell crabs are shed from green, ripe and buster crabs, and in particular, a float having side and end walls extended from a base with continuous rows of louvers in the walls and with sealed tubes adjustably mounted on the side and end walls whereby air sealed in the tubes provides sufficient buoyancy to float the base and side and end walls under extreme weather conditions.

The purpose of this invention is to obviate the loss experienced with conventional crab floats made of wood beams and slats wherein rough weather breaks and sinks the floats and which require servicing, such as cleaning and being removed from the water during the winter months.

Crab floats made of wood require servicing continuously as in order to obtain complete circulation of water through the floats the slats are comparatively small and break easily. Furthermore, because of rough winter weather, it is necessary to remove crab floats made of wood from the water during the winter and due to the parts being fairly water soaked the floats are comparatively heavy. In addition, the small slats are readily broken providing escape openings in walls of the floats and numerous crabs escape. With these thoughts in mind, this invention contemplates a crab float made of metal with tubes filled with air positioned at the sides providing buoyant means and with an arrangement of louvers in the walls providing efficient circulating means.

The object of this invention is, therefore, to provide means for forming a crab float whereby the float is adapted to remain in the water continuously from season to season and wherein the possibility of damage to parts thereof is reduced to a minimum.

Another object of the invention is to provide a durable crab float having buoyant elements adjustably mounted on outer surfaces thereof in which the buoyant elements are adapted to be set to regulate the depth of the float in the water.

A further object of the invention is to provide an improved metal float for crabs and the like in which the float is of a simple and economical construction.

With these and other objects and advantages in view, the invention embodies a float having an elongated plate providing a base, side and end walls having rows of louvers therein and inwardly extended flanges on upper edges thereof extended upwardly from said base, sealed tubes extended from outer surfaces of the walls and means for adjustably mounting the sealed tubes on mounting elements at the corners of the float.

Other features and advantages of the invention will appear from the following description, taken in connection with the drawings, wherein:

Figure 1 is a side elevational view illustrating the improved metal crab float, parts of a buoyant element on the side of the float being broken away.

Figure 2 is an end elevational view of the float.

Figure 3 is a view looking upwardly toward the under surface of the float.

Figure 4 is a perspective view showing the float in the position in which it is used.

Figure 5 is a cross section through one end of the float taken on line 5—5 of Figure 3, the parts being shown on an enlarged scale.

Figure 6 is a sectional plan through one corner of the float taken on line 6—6 of Figure 5.

Figure 7 is a sectional plan through the intermediate part of the float being taken on line 7—7 of Figure 1 and the parts being shown on an enlarged scale.

Figure 8 is a section taken on line 8—8 of Figure 2 illustrating the construction and an upper corner of the float.

Referring now to the drawings, wherein like reference characters denote corresponding parts, the improved crab float of this invention includes a base plate 10, side walls 11 and 12 extended upwardly from sides of the base, end walls 13 and 14 also extended upwardly from the base, sealed tubes 15 and 16 spaced from the side walls 11 and 12, respectively, and similar tubes, as indicated by the numerals 17 and 18, spaced from the end walls of the float.

Each of the walls is provided with three rows of louvers including an upper row 19, an intermediate row 20, and a lower row 21 and, as illustrated in Figure 5, the louvers 20 of the intermediate row are alternately and oppositely positioned in relation to the louvers 19 and 20 of the upper and lower rows. With the louvers in these positions, complete circulation of water through the float is assured, as illustrated by the arrows 22, shown in Figure 6.

The lower edges of the side walls 11 and 12 are provided with flanges 23 and 24, respectively, upon which the base plate 10 is positioned and similar flanges are provided on the end walls as indicated by the numerals 25 and 26. As illustrated in Figure 5, the edges of the base plate 10 are secured to the flanges of the side and end walls with bolts 27 having nuts 28 threaded thereon.

The upper edges of the side and end walls of the float are also provided with flanges, as indicated by the numeral 29 in Figure 5, and a continuous top plate 30 with a rolled inner edge 31 is secured to the flanges 29 with bolts 32, the inner ends of the bolts being provided with nuts 33.

The corners of the float are provided with Z-bars 34, flanges 35 of which are secured to the walls with bolts 36 having nuts 37 thereon, and flanges 38 at the opposite ends provide seats for blocks 39 to which the buoyant tubes are secured with straps 40, flanges 41 and 42 of which are secured to the blocks and flanges 38 with screws 43 and 44.

The flanges 38 of the supporting members, such as the Z-bars 34, are provided with a plurality of spaced threaded openings, as indicated by the numeral 45 whereby the screws 43 and 44 may be moved vertically to adjust positions of the buoyant members to regulate the depth of water in the float.

Each of the buoyant tubes is sealed at both ends with plates 46 and the members 15 and 16 at the sides are supported intermediate of the ends with Z-bars 47, similar to the Z-bars 34, at the corners of the float.

With the parts designed and assembled in this manner, the float may readily be taken apart for storing and shipping and the elevation of the buoyant elements may be adjusted to regulate the depth of water in the float. With the louvers protected by the buoyant tubes, the possibility of breaking the thin metal straps between the louvers to permit crabs to escape is reduced to a minimum and as the buoyant elements retain the device on the upper surface of the water continuously there is very little possibility of losing a float so that the practice of removing the heavy water soaked floats from the water in the fall and replacing the floats in the water in the spring is obviated in warmer climates.

Although the float is described as being particularly adapted for crabs, it may also be used for oysters, lobsters, and other crustacea.

It will be understood that modifications, within the scope of the appended claims, may be made in the design and arrangement of the parts without departing from the spirit of the invention.

What is claimed is:

1. A crab float comprising a base plate, side and end walls having spaced openings therein extended upwardly from sides and ends of the base plate, bars having spaced openings therein vertically positioned on outer surfaces of the side and end walls of the float, sealed tubes spaced from and positioned on outer surface of the side and end walls and U-shaped straps having flanged ends secured by fastening elements through said flanged ends to the bars whereby the tubes are adjustable vertically to control the elevation of the float in water.

2. A crab float comprising an elongated base plate, side and end walls having spaced louvers therein extended upwardly from sides and ends of the base plate, vertically disposed bars having spaced openings therein positioned on outer surfaces of the side and end walls, sealed tubes spaced from the side and end walls, blocks positioned between the tubes and bars, straps having flanged ends extended around the tubes, and fasteners extended through the flanges of the ends of the straps, blocks, and bars for mounting the sealed tubes on the float.

3. In a float for crabs and the like, the combination which comprises an elongated plate providing a base, side and end walls having rows of spaced vertically positioned louvers therein extended upwardly from sides and ends of the base plate, vertically disposed bars having spaced openings therein mounted on outer surfaces of the side and end walls, blocks positioned against said bars, sealed tubes positioned against the blocks, U-shaped straps having flanged ends extended around the tubes, and fasteners connecting the flanged ends of the straps to the vertically spaced bars through the blocks, said sealed tubes being positioned in a horizontally disposed plane below a horizontally disposed plane midway of the height of said walls.

4. In a float for crabs and the like, the combination which comprises an elongated plate providing a base, side and end walls having rows of spaced vertically positioned louvers therein extended upwardly from sides and ends of the base plate, vertically disposed bars having spaced openings therein bolted to and extended from said side and end walls, blocks positioned against bars and sealed tubes adjustably mounted by straps with flanged ends and suitable fastening elements on said blocks and bars, said sealed tubes being positioned in a horizontally disposed plane below a horizontally disposed plane midway of the height of said walls.

5. In a float for crabs and the like, the combination which comprises vertically disposed side and end walls having inwardly extended flanges on lower edges thereof, a base positioned to rest on the flanges extended inwardly from the side and end walls, said side and end walls having rows of spaced vertically disposed louvers therein, vertically positioned Z-bars secured to outer surfaces of the side and end walls, and sealed tubes spaced from the walls and adjustably mounted on said Z-bars, said sealed tubes being positioned in a horizontally disposed plane below a horizontally disposed plane midway of the height of said walls.

6. In a float for crabs and the like, the combination which comprises vertically disposed side and end walls having inwardly extended flanges on lower edges thereof, a base positioned to rest on the flanges extended inwardly from the side and end walls, said side and end walls having rows of spaced vertically disposed louvers therein, vertically positioned Z-bars secured to outer surfaces of the side and end walls, sealed tubes adjustably mounted on said Z-bars, spacing blocks positioned between the sealed tubes and Z-bars, strips with flanged ends extended around the sealed tubes, and screws extended through the flanges and ends of the spacing blocks and threaded into the Z-bars for adjustably mounting the sealed tubes on the Z-bars.

7. In a float for crabs and the like, the combination which comprises vertically disposed side and end walls having inwardly extended flanges on lower edges thereof, a base positioned to rest on the flanges extended inwardly from the side and end walls, said side and end walls having rows of spaced vertically disposed louvers therein, vertically positioned Z-bars secured to outer surfaces of the side and end walls, sealed tubes adjustably mounted on said Z-bars, spacing blocks positioned between the sealed tubes and Z-bars, and finishing strips with rolled inner edges mounted on upper edges of the side and end walls.

References Cited in the file of this patent

UNITED STATES PATENTS

| Number | Name | Date |
|---|---|---|
| 316,775 | Hardman | Apr. 28, 1885 |
| 521,244 | Muncaster | June 12, 1894 |
| 1,444,367 | Collamer | Feb. 6, 1923 |
| 1,488,331 | Ferris | Mar. 25, 1924 |
| 2,151,799 | Richter | Mar. 28, 1939 |
| 2,283,472 | Tuxhorn | May 19, 1942 |
| 2,328,993 | Norling | Sept. 7, 1943 |
| 2,658,101 | Coxe | Nov. 3, 1953 |